Jan. 21, 1936.  C. B. CLARK  2,028,733
PRODUCTION OF SULPHURIC ACID BY THE CONTACT PROCESS
Filed June 6, 1933  2 Sheets—Sheet 2
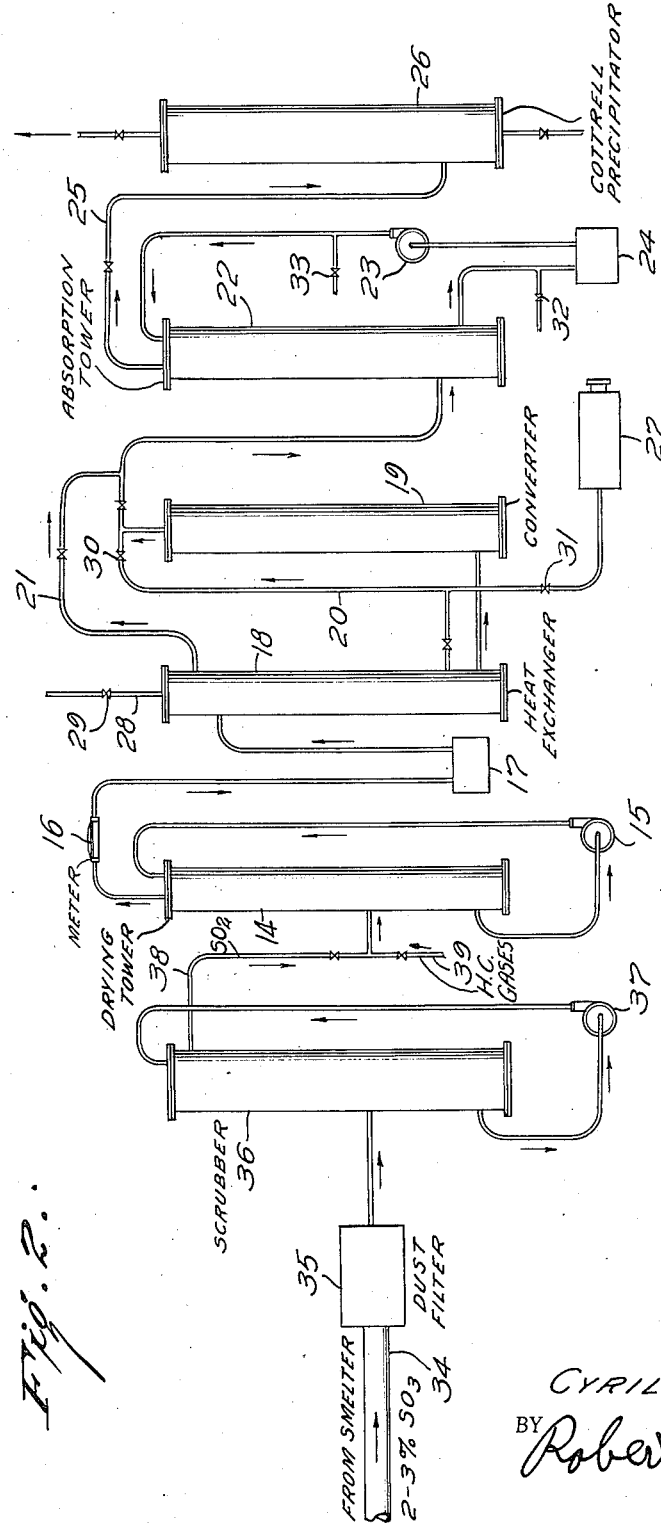
INVENTOR.
CYRIL B. CLARK,
BY Robert Ames Norton
ATTORNEY.

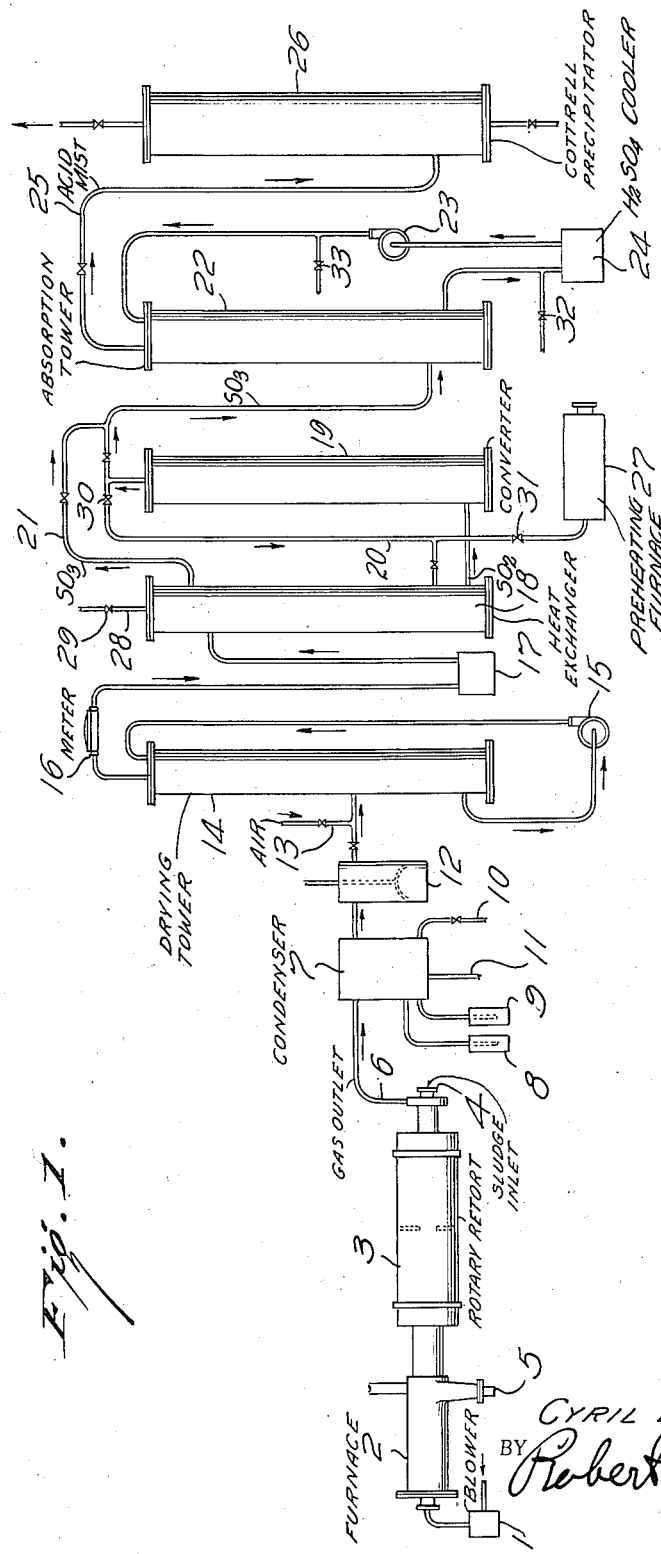

Patented Jan. 21, 1936

2,028,733

UNITED STATES PATENT OFFICE 2,028,733

PRODUCTION OF SULPHURIC ACID BY THE CONTACT PROCESS

Cyril B. Clark, Scarsdale, N. Y., assignor to American Cyanamid Company, New York, N. Y., a corporation of Maine Application June 6, 1933, Serial No. 674,489

10 Claims. (Cl. 23—175)

This invention relates to the production of sulphuric acid by the contact process using $SO_2$ gases containing hydrocarbons or other hydrogen containing substances, and more particularly to the production of sulphuric acid by a contact process using $SO_2$ gases obtained by the thermal decomposition of sulphuric acid sludges from the sulphuric acid purification of carbonaceous material such as, for example, petroleum products.

Petroleum refineries using strong sulphuric acid as a solvent and reagent in the purification of the various petroleum fractions produce large quantities of so-called acid sludge, which is a mixture of sulphuric acid and various partly or wholly sulphonated organic compounds together with a considerable amount of hydrocarbons which are present in solution. This sludge in most communities cannot be used as a fuel because of the sulphur dioxide given off in burning which constitutes a serious nuisance and even in isolated communities presents a serious corrosion problem in the burner equipment. For this reason the sludge has proved to be a waste product, the disposal of which has created a considerable problem. Moreover, it contains large amounts of sulphur in combined form which, of course, is normally wasted. Various attempts have been made to produce $SO_2$ from this acid sludge by different methods using distillation. Up to the present time the only commercially successful method is that described in the application of I. Hechenbleikner, Serial No. 568,050, filed October 10, 1931 now Patent No. 1,953,225 dated April 3, 1934. In this process the acid sludge is thermally decomposed by means of combustion gases which contact directly with the sludge inside a rotary kiln. Other processes include the use of an externally fired rotary kiln with a fluid sludge which is maintained continuously in a fluid state.

All of the processes produce $SO_2$ from acid sludge by thermal decomposition and result in a gas which contains not only $SO_2$, but considerable amounts of water and various hydrocarbons together with a considerable portion of carbon dioxide and sometimes nitrogen particularly in the Hechenbleikner process when combustion gases are employed. Normally this $SO_2$ gas is subjected to cooling or refrigeration in water cooled condensers followed by drying in drying towers usually by means of sulphuric acid which results in the condensation and removal of water and of the heavier condensable hydrocarbons. After leaving the drying tower, the amount of free water vapor is normally of the order of 2 milligrams per cubic foot of gas, but there is a very considerable quantity of uncondensable or difficulty condensable hydrocarbons and other hydrogen containing gases. When these gases pass through a sulphuric acid converter they are, of course, oxidized producing water as one of the products.

The presence of water in the gases in amounts greater than 25 to 30 milligrams per cubic foot, which means the presence of from 2½ to 3 milligrams of hydrogen per cubic foot, causes a serious problem because when the water content of the converted gases leaving the sulphuric acid converter exceeds 25 to 30 milligrams per cubic foot, on cooling it unites with some of the sulphur trioxide to form sulphuric acid mist. This acid mist is strongly corrosive if it is permitted to further condense out on the walls of the equipment, and it cannot be completely absorbed by the sulphuric acid in the normal absorbing tower. This gives rise to fumes which are highly corrosive to exhaust stacks and constitute quite a serious nuisance.

In order to avoid the difficulty encountered by the presence of hydrocarbon gases in the $SO_2$ coming from an acid sludge still and similar gases containing hydrogen or hydrocarbons various methods can be employed, thus, for example, the Hechenbleikner application, above referred to, suggests the complete removal of hydrocarbon gases. In my co-pending application Serial No. 670,123, filed May 9, 1933, I have described a process in which the removal of the hydrocarbon gases is only partial, keeping the hydrogen content below 2½ to 3 milligrams per cubic foot. Other methods of overcoming this serious difficulty include the combination of an acid sludge still with another source of sulphur dioxide, such as a sulphur or ore burner. This combined process which dilutes the hydrocarbons in the $SO_2$ gases from the acid sludge still is described and claimed in my co-pending application Serial No. 671,647, filed May 18, 1933.

Methods which involve partial or total removal of the hydrocarbon gases or dilution by admixture with $SO_2$ gases from other sources, while effective, either require additional equipment, which in some cases may be quite expensive, or require a market for acid of such character that a large portion of the $SO_2$ may be obtained from sulphur or ore burners. For these reasons the various processes of acid sludge decomposition have lacked flexibility and in some cases have been unnecessarily costly.

$SO_2$ gases from distillation of acid sludge contain hydrocarbons of necessity, but it is desirable in some cases to deliberately add hydrocarbons to certain $SO_2$ gases, namely gases that are very weak in $SO_2$. In order that a converter may operate satisfactorily, the concentration of $SO_2$ must be sufficiently high to generate enough heat to keep the reaction going. Normally 3½% $SO_2$ is about the lower limit which can be used without external heat, and even with a gas of this strength operation is somewhat erratic. However, if a small amount of hydrocarbons are added the very great evolution of heat in the burning of the hydrocarbons will compensate for gases deficient in $SO_2$. Thus (for example a percent or even a fraction of a percent of hydrocarbons will add sufficiently to the heat evolution of a weak $SO_2$ gas so that satisfactory converter operation may be obtained. In the past, however, this simple method of dealing with dilute $SO_2$ gases has not been used to any considerable extent because the burning of hydrocarbons generates sufficient water to raise difficulties due to the formation of acid mist. It is an advantage of the present invention that it may be applied to weak $SO_2$ gases which have been fortified by the addition of sufficient hydrogen or hydrocarbon containing gases to provide adequate heat in the converter.

According to the present invention the disadvantages involved in the presence of hydrogen containing gases in $SO_2$ are overcome without requiring elaborate equipment or very careful operating conditions, the latter being an important factor as the gas from an acid sludge still is rarely uniform particularly in batch processes and shows considerable variation because of fluctuating sludge composition, even in the most highly efficient continuous processes such as that described in the Hechenbleikner application, above referred to. This requires continual adjustment and very careful supervision if the hydrocarbon gas content is to be kept continually below 2½ to 3 milligrams per cubic foot. According to the present invention no attempt is made to reduce the content of hydrogen containing gases below any particular limits and an $SO_2$ gas, which has merely been dried, is sent directly through the converter. Acid mist is kept from corroding the equipment by maintaining the gas stream between converter and absorber at a temperature above that of the dew point for the acid mist, that is to say above about 550 to 600° F. At this temperature no acid mist separates out and most of the $SO_3$ can be absorbed. The acid mist formed in the absorber is, of course, incompletely absorbed and passes out of the absorber in considerable quantities. I have found, however, that even the large amounts of acid mist which is formed when an $SO_2$ gas from the distillation of acid sludge is used, can be precipitated electrically or mechanically by Cottrell precipitators or coke filters and no difficulty is encountered due to corrosion of the exhaust stack and no fume nuisance is created.

The present invention which acts directly contrary to the procedure hitherto adopted in the utilization of $SO_2$ gases from the distillation of acid sludge and similar sources avoids all the difficulties due to expensive equipment and careful operating supervision which are necessary when the hydrocarbon gases are removed. The process is extremely flexible and permits operation with a minimum of skilled supervision and at the same time does not present any nuisance or corrosion problems. Since no attempt is made to maintain any particular concentration of hydrogen containing gases in the $SO_2$ stream, the operation of the process is unaffected by fluctuations in sludge composition or other operating conditions of the still. The mist precipitator is automatic in its operation and is of sufficient capacity so that fluctuations in the amount of mist produced do not have any deleterious effect and require no adjustment or other careful operating control.

The invention is particularly applicable to the use of $SO_2$ gases from petroleum acid sludge, but, of course, may be used with $SO_2$ from sludges from the purification of other carbonaceous material. The amount of hydrocarbon will, of course, vary with the character of the sludge and while the present invention will handle the gases from any type of sludge it should be noted that since there is no removal of hydrogen containing materials substantially all of the hydrogen which is transformed into water is absorbed in the acid system and, therefore, enters as a factor in the water balance of the system. Where the amount of hydrocarbon gases is very high, the amount of water produced may in certain cases exceed that required for reaction with the $SO_3$ from the converter, particularly when it is borne in mind that normally the acid from the drying tower forms part of the system. In cases where the water is greater than that sufficient to produce the desired strength of acid, it may be necessary to remove a part of the hydrocarbon gases or to take out part or all of the drying tower acid from the circuit. This latter procedure, in which the excess diluted drying tower acid is recirculated through the acid sludge still, is described in an application of I. Hechenbleikner, Serial No. 574,244, filed November 11, 1931, now Patent 2,001,359, issued May 14, 1935. When the hydrocarbon content is somewhat lowered in a modification of the present invention, the hydrocarbon removing equipment is not entirely dispensed with as in the preferred modification where all of the hydrocarbon gases remain in the stream. Despite the fact that the hydrocarbon removing equipment is not entirely eliminated in such a modification, it nevertheless represents a distinct operating improvement over the systems in which the hydrocarbon gases are entirely removed or are brought down below an extremely low maximum. Since it is only necessary to assure a rough removal of excess hydrocarbon gases so that the amount present will not overload the entire acid circulating system, it is, of course, unnecessary to control the removal within any accurate limits and a considerable simplification of operating technique and reduction in skilled supervision is effected even in this modification of the invention.

The present invention may, of course, be included in a combined process using $SO_2$ from acid sludge and from the burning of sulphur containing material in a single plant. However, such specific modification is not claimed in the present application and this forms a specific portion of the subject matter of my co-pending application Serial No. 671,647, above referred to.

When $SO_2$ from an acid sludge decomposition system operating on the Hechenbleikner process is used in the present invention it is necessary to use a heat exchanger in order to preheat the cold $SO_2$ gases before the latter enter the converter. Where dilute $SO_2$ gases are fortified with hydrocarbons they may be either cold or hot, depending upon the system employed in obtaining them. Also, it is possible to obtain hot gases from an acid sludge decomposition process by using the method described in the co-pending application of Rumple, Serial No. 701,137, filed December 6, 1933, in which a stream of SO$_2$ is built up by gases from an acid sludge kiln and recirculating them through a water cooled condenser and then through a heat exchanger or stove, finally passing them again through the kiln. This cyclic process builds up the SO$_2$ over 80% and a small amount of the gases are bled continuously either before or after passing through the heat exchanger or stove and the kiln. They are, of course, at high temperature and a heat exchanger is unnecessary and the gases can be passed directly into the converter without further treatment except an addition of sufficient air for the reaction. Wherever hot gases containing hydrocarbons or hydrogen can be employed, the heat exchanger is eliminated and no danger of corrosion arises. Where cold gases are employed necessitating the heat exchanger care should be taken that the gases from the converter passing through the heat exchanger are kept at a temperature above the dew point of the acid mist in order to obviate any danger of corrosion.

In the drawings Fig. 1 is an elevation of a system taking SO$_2$ gases from a sludge distillation kiln operating under the Hechenbleikner process; and Fig. 2 is an elevation of a system taking weak SO$_2$ gases from a smelter and enriching them by the addition of hydrocarbon or hydrogen containing gases.

Air is blown by the blower 1 into a combustion furnace 2 in which carbonaceous or sulphur containing material may be burned. The combustion gases pass into the rotary kiln or retort 3 through which a stream of acid sludge passes from the sludge inlet 4 to the outlet for distilled carbonaceous residue 5. It will be apparent that as the sludge flows slowly in countercurrent to the hot combustion gases it passes successively through zones of increasing temperature, the first zone being at temperatures sufficient to distill off water and lighter hydrocarbons and further zones being at temperatures high enough to cause rapid reduction of SO$_4$ containing compounds to SO$_2$ while the last zone is at a temperature at which a readily granulatable fuel can be obtained. Discharge from 5 may be either continuous or intermittent. The gases from the still leave at the sludge inlet end through the pipe 6 passing into a water cooled condenser 7 where heavy hydrocarbons and water are condensed out in different layers. The heavy hydrocarbons being discharged through an oil boot 8 while the water flows out through a water boot 9. Cooling water is introduced through the pipe 10 and leaves through the pipe 11.

The gases from the condenser pass through a relief valve 12 and after admixture with air through the valved pipe 13 enter the drying tower 14 where they are subjected to scrubbing with sulphuric acid which is recirculated by means of the acid pump 15. The dehydrated gases pass out of the top of the tower through the meter 16 into the suction of the blower 17 whence they are discharged through a heat exchanger 18 into the converter 19. The heat exchanger is heated in normal operation by a portion of the gases from the converter flowing through the pipe 20 and out through the pipe 21. Care is taken to prevent the temperature of the gases in the heat exchanger from dropping below the dew point for acid mist. The gas from the heat exchanger and directly from the converter then passes into absorber 22 where most of the SO$_3$ is absorbed by scrubbing with sulphuric acid which is circulated by means of the acid pump 23 through a cooler 24. The exhaust gases containing some acid mist pass out through pipe 25 into a Cottrell precipitator 26. If desired, the precipitator may be replaced by a coke filter. In order to start up the system it is necessary to supply heat to the heat exchanger 18 until a temperature is reached which will permit the ignition of the gas in the converter. This is effected by using a starting furnace 27 which connects into the pipe 20. This pipe is provided with a valve 30 and the pipe leading from the starting furnace is provided with a valve 31. Exhaust heating gases leave the heat exchanger through the pipe 28 controlled by the valve 29. Of course, in starting up, valves 29 and 31 are opened and valve 30 is closed. As soon as normal operation is attained valve 30 is opened and valves 29 and 31 are closed. The acid mist condensed in the precipitator or coke filter is, of course, returned to the acid circulation system.

In the drawings in Fig. 2 the drying tower and converter system is exactly the same as in Fig. 1, and the same parts bear the same reference characters. Instead of taking gases from an acid sludge still, they are taken from a smelter or similar source of weak SO$_2$ gases (not shown) and enter through a pipe 34, passing through dust filter 35 and scrubbing tower 36 where dilute sulphuric acid is circulated by means of the acid pump 37. From the scrubber the gases pass through pipe 38 into the drying tower 14 after enrichment with hydrocarbon gases entering through the valved pipe 39. These gases may be natural gas, tail gases from cracking stills, water gas or any other suitable combustible mixture containing hydrogen or hydrocarbon. After passing through the drying tower the gases are preheated and converted in the same manner as described in connection with Fig. 1. The added hydrocarbon or hydrogen content is large enough to increase the heat of reaction in the converter sufficiently to maintain an adequate temperature. The acid mist leaving the absorption tower is precipitated by a Cottrell precipitator or taken in a coke box.

The invention has been described specifically in conjunction with a sulphuric acid absorber and electrostatic precipitator. This modification is the most economical and the simplest for most installations. However, it is not essential to use the ordinary type of sulphuric acid absorber, and where acid of high purity is desired, and the extra expense is warranted, the absorber may be entirely dispensed with and sufficient steam mixed with SO$_3$ gases from the converter so as to unite with all of the SO$_3$ to form sulphuric acid. The condensation of the acid, of course, has to take place in completely acid-proof equipment. For example, equipment made of silica or provided with a suitable acid-proof lining. This method of direct condensation of sulphuric acid is not claimed per se in the present application, as it is a well known method and is described, for example, in the patents to W. S. Allen, No. 1,771,520 of July 29, 1930 and No. 1,865,607 of July 5, 1932. It is an advantage of the present invention that it can be utilized in conjunction with any suitable acid condensation equipment which will permit operation with a moisture content such as to normally result in acid mist, and modifications which do not use the conventional sulphuric acid absorber are therefore included.

Not only does the present invention eliminate equipment which would be otherwise required for removing hydrocarbon gases, partly or wholly, but it presents a further advantage over systems in which the hydrocarbon gases are removed, inasmuch as these systems are apt to produce some free carbon or tarry material which may contaminate the drying tower acid. For many purposes it is desirable to obtain all of the acid as a water-white product and for such plants, the present invention is particularly advantageous.

I claim:

1. A process of producing sulphuric acid which comprises subjecting a gas containing $SO_2$, sufficient oxygen to permit oxidation of the $SO_2$ to $SO_3$, and a gaseous combustible hydrogen containing material in the gas having a hydrogen content greater than 3 milligrams per cubic foot to oxidation in a sulphuric acid converter in the presence of a sulphuric acid contact mass at reaction temperature whereby the $SO_2$ is transformed into $SO_3$ and the hydrogen content of the gas is oxidized to $H_2O$, passing the reacted gases into a sulphuric acid absorber without permitting the temperature to fall below the dew point for acid mist and subjecting the exhaust gases from the absorber to dry precipitation of residual acid mist.

2. A process of producing sulphuric acid which comprises subjecting residual sludge from the sulphuric acid purification of carbonaceous material to thermal decomposition with the formation of a gas containing $SO_2$, removing the major portion of free water vapor from said gas permitting sufficient combustible hydrogen containing gases to remain in the gas so that the hydrogen content after adjustment of the gas composition for sulphuric acid conversion exceeds 3 milligrams of hydrogen per cubic foot, adjusting the composition of the gas by the addition of oxygen containing gas, passing the adjusted gas stream at reaction temperature over a sulphuric acid contact mass in a converter, maintaining the temperature of the converted gases above the dew point for acid mist, absorbing the gases in a sulphuric acid absorber and subjecting the exhaust gases from the absorber to dry precipitation of residual acid mist.

3. A process of producing sulphuric acid which comprises subjecting residual sludge from the sulphuric acid purification of petroleum products to thermal decomposition with the formation of a gas containing $SO_2$, removing the major portion of free water vapor from said gas permitting sufficient combustible hydrogen containing gases to remain in the gas so that the hydrogen content after adjustment of the gas composition for sulphuric acid conversion exceeds 3 milligrams of hydrogen per cubic foot, adjusting the composition of the gas by the addition of oxygen containing gas, passing the adjusted gas stream at reaction temperature over a sulphuric acid contact mass in a converter, maintaining the temperature of the converted gases above the dew point for acid mist, absorbing the gases in a sulphuric acid absorber and subjecting the exhaust gases from the absorber to dry precipitation of residual acid mist.

4. A method according to claim 2 in which the uncondensable hydrocarbon content of the gases is not reduced at all after leaving the acid sludge still.

5. A method according to claim 3 in which the uncondensable hydrocarbon content of the gases is not reduced at all after leaving the acid sludge still.

6. A method according to claim 2 in which the acid mist is precipitated electrostatically.

7. A method according to claim 3 in which the acid mist is precipitated electrostatically.

8. A method of producing sulphuric acid which comprises subjecting an acid sludge from the sulphuric acid purification of petroleum products to thermal decomposition with formation of a gas containing $SO_2$ by subjecting acid sludge to the contact of hot combustion gases, removing the major portion of free water vapor from the $SO_2$ gas permitting sufficient combustible hydrogen containing gases to remain in the gas so that the hydrogen content after adjustment of the gas composition for sulphuric acid conversion exceeds 3 milligrams of hydrogen per cubic foot, adjusting the composition of the gas by the addition of oxygen containing gas, passing the adjusted gas stream at reaction temperature over a sulphuric acid contact mass in a converter, maintaining the temperature of the converted gases above the dew point for acid mist, absorbing the gases in a sulphuric acid absorber and subjecting the exhaust gases from the absorber to dry precipitation of residual acid mist.

9. A method according to claim 8 in which none of the hydrogen containing gases are removed from the stream prior to its passage through the converter.

10. A method of producing sulphuric acid from gases containing an $SO_2$ concentration insufficient for adequate heat maintenance in the converter, which comprises adding to the $SO_2$ gas sufficient gaseous hydrogen containing substances to supply enough heat during the conversion to maintain proper temperature conditions in the converter, adjusting the oxygen content of the gas for conversion of the $SO_2$ and combustion of the hydrogen containing material and passing the gas stream at reaction temperature over a contact sulphuric acid catalyst in a converter, maintaining the temperature of the converted gases above the dew point of acid mist, absorbing the gases in a sulphuric acid absorber and subjecting the exhaust gases from the absorber to dry precipitation of acid mist.

CYRIL B. CLARK.